United States Patent
Rempe et al.

(10) Patent No.: US 11,946,668 B2
(45) Date of Patent: Apr. 2, 2024

(54) SYSTEM AND METHOD FOR HEATING UP WATER FOR A CONSUMER UNIT IN AN AIRCRAFT

(71) Applicant: Airbus Operations GmbH, Hamburg (DE)

(72) Inventors: Michael Rempe, Hamburg (DE); Frederik Albers, Hamburg (DE); Frank Schneider, Hamburg (DE); Axel Schreiner, Hamburg (DE); Tim Lübbert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/848,997

(22) Filed: Jun. 24, 2022

(65) Prior Publication Data

US 2022/0412606 A1 Dec. 29, 2022

(30) Foreign Application Priority Data

Jun. 25, 2021 (EP) .................................. 21181889

(51) Int. Cl.
  *F24H 15/14* (2022.01)
  *B64D 11/02* (2006.01)
  (Continued)

(52) U.S. Cl.
  CPC ............ *F24H 15/14* (2022.01); *B64D 11/02* (2013.01); *G05D 23/1917* (2013.01)

(58) Field of Classification Search
  CPC .......... F24H 15/14; B64D 11/02; B64D 11/04
  See application file for complete search history.

(56) References Cited

U.S. PATENT DOCUMENTS

| | | | |
|---|---|---|---|
| 2016/0176526 A1* | 6/2016 | Becker | H02J 3/381 307/9.1 |
| 2019/0367189 A1 | 12/2019 | Flashaar et al. | |
| 2020/0308036 A1* | 10/2020 | Trant | C02F 5/08 |

FOREIGN PATENT DOCUMENTS

| | | |
|---|---|---|
| CN | 212 222 694 U | 12/2020 |
| DE | 38 36 523 A1 | 5/1989 |

(Continued)

OTHER PUBLICATIONS

Shiraishi et al., original and translation of JP-H09196468-A (Year: 1997).*

(Continued)

*Primary Examiner* — Steven S Anderson, II
(74) *Attorney, Agent, or Firm* — KDW Firm PLLC

(57) ABSTRACT

A system for heating up water for a consumer unit in an aircraft, having a water reservoir and a control unit. The water reservoir has a heating device to heat water held in the water reservoir to a consumer temperature. The control unit controls the heating device so water in the water reservoir is automatically heated to or above a disinfection temperature at which germ formation in the water reservoir is eliminated or suppressed, and a temperature of the water in the water reservoir is maintained at or above the disinfection temperature for a disinfection period, the heating to the disinfection temperature being effected only during flight phases or portions of flight phases of the aircraft during which use of the consumer unit by a user is not to be expected. A corresponding method and an aircraft having such a system are disclosed.

15 Claims, 3 Drawing Sheets

(51) Int. Cl.
*B64D 11/04* (2006.01)
*G05D 23/19* (2006.01)

(56) References Cited

FOREIGN PATENT DOCUMENTS

| JP | H09196468 A | * | 7/1997 | | |
|---|---|---|---|---|---|
| RU | 2 719 044 C1 | | 4/2020 | | |
| WO | WO-2014111861 A1 | * | 7/2014 | ............. | B64D 41/00 |

OTHER PUBLICATIONS

European Search Report for Application No. 21181889 dated Dec. 7, 2021.

* cited by examiner

SYSTEM AND METHOD FOR HEATING UP WATER FOR A CONSUMER UNIT IN AN AIRCRAFT

CROSS-REFERENCE TO RELATED APPLICATION

This application claims priority to EP Application No. 21181889.3 filed Jun. 25, 2021, the entire disclosure of which is incorporated by reference herein.

TECHNICAL FIELD

The disclosure herein relates to a system for heating up water for a consumer unit in the aircraft, comprising a water reservoir and a control unit. Furthermore, the disclosure herein comprises a method for heating up water for a consumer unit in the aircraft, and an aircraft having a corresponding system.

BACKGROUND

In consumer units of aircraft such as, for example, washrooms or the on-board kitchens, so-called galleys, hot water is provided at wash basins, which can be used for washing hands or washing up, for example. To produce hot water, located near the wash basins there is a local water reservoir, in which water from a central water tank is stored temporarily. The water reservoir comprises a heating device by which water held in the water reservoir is heated to a hot-water temperature of, for example, 60° C. The hot-water temperature is selected in such a manner that there is no significant germ formation in the water reservoir, or germ colonisation on its internal surfaces, thus avoiding negative influences on the hygienic (drinking-) water quality. When hot water is to be drawn from the washbasin, the water heated to the hot-water temperature is mixed with cold water from the central water tank in order to cool it down to a consumption temperature at which no scalding occurs. The desired consumer temperature can be partially set by the user of the washbasin using a mixer tap.

SUMMARY

Against this background, it is an object of the disclosure herein to provide an improved system for heating up water for consumer units in aircraft.

This object is achieved by a system, a method, and an aircraft as disclosed herein. Preferred designs of the system and of the method are disclosed herein.

In a first aspect, the object is achieved by a system for heating up water for a consumer unit in an aircraft, comprising a water reservoir and a control unit. The water reservoir comprises a heating device configured to heat water held in the water reservoir to a consumer temperature, such that water can be provided at the consumer temperature from the water reservoir to the consumer unit for immediate use, in particular the consumer temperature being selected such that there is no need for a mixer tap. The control unit is configured to control the heating device such that water held in the water reservoir is automatically heated to a disinfection temperature at which germ formation and colonisation in the water reservoir and on its internal surfaces is eliminated or suppressed by thermal treatment, and a temperature of the water in the water reservoir is maintained at or above the disinfection temperature for a disinfection period, the heating to the disinfection temperature being effected only during flight phases or portions of flight phases of the aircraft during which use of the consumer unit by a user is not to be expected.

In other words, the disclosure herein relates to a system by which water for consumer units such as, for example, washrooms, galleys or showers on aircraft can be heated. The system comprises, firstly, a water reservoir having a heating device. This heating device is used to heat water in normal operation to a temperature suitable, for example, for washing hands and face, for showering or for washing up. This water temperature is referred to below as the consumer temperature. It is selected so that the water feels pleasant to the user and scalding cannot occur. As a result of water being provided directly at the consumer temperature, mixing taps and similar appliances can advantageously be dispensed with, such that the weight of this additional equipment can be saved. In addition, energy is saved because water is not first heated to a significantly higher hot-water temperature with higher heat losses, only subsequently to cool down again to a cooler consumer temperature.

However, heating the water to consumer temperature presents the problem that germ formation, and thus contamination of the water in the water reservoir and especially on the internal surfaces of the water reservoir, can occur. It is therefore provided in this case to temporarily heat the water held in the water reservoir to a temperature at which hygienically relevant germs in the water reservoir, i.e. on the internal surfaces of the reservoir and in the water contained therein, are largely killed. The sustained formation of hygienically relevant germ colonisation (in a biofilm) on the internal surfaces of the water reservoir is thereby suppressed, or prevented. This temperature, which for example is between 60° C. and 90° C., is referred to below as the disinfection temperature. For this purpose, the heating device is activated accordingly by the control unit of the system at regular time intervals.

The control unit may be, for example, a decentralized control unit that is assigned to the consumer unit in a decentralized manner. However, the function of the control unit may also be located in a central control unit that controls, for example, one or more consumer units, or even the entire cabin of the aircraft. In any case, the control unit may consist of a single module or may be divided into a plurality of modules.

The water is maintained at or above the disinfection temperature for a disinfection period in order to ensure that hygienically relevant germ colonisations in the water reservoir are killed, or suppressed.

In order to prevent the water heated to disinfection temperature from being taken from the water reservoir by a user, the heating to disinfection temperature is advantageously effected only during flight phases or portions of flight phases in which it can be ensured that nobody will use the consumer unit. For this purpose, the control unit advantageously accesses flight data of the aircraft, in particular directly accesses the flight phases, and controls the heating device in such a manner that water in the water reservoir is only heated to the disinfection temperature and kept at, or above, this temperature if it can be assumed, on the basis of the current flight phase, that no user is using the consumer unit. For example, the landing approach or the subsequent taxiing on the runway, or taxiway, to the parking position of the aircraft may be used to disinfect the water reservoir by heating the water to or above the disinfection temperature. It is also possible to spread the heating over several flight phases, so for example the landing approach and the subsequent taxiing on the runway and taxiway may be used for disinfection. It is also possible to use only a portion of a flight phase, e.g. the landing approach.

In a preferred embodiment, the control unit is configured to be connected to a data bus of the aircraft and to receive from the data bus the current flight phase of the aircraft. Advantageously, the flight phase can be read directly from the data bus by the control unit without the need for manual input of the same at the control unit. Thus, the disinfection of the water in the water reservoir can be performed fully automatically. A data bus in this case means any connection via which data are transmitted within the aircraft. The data bus may be wired, for example in the form of an Ethernet connection, a CAN bus or an optical fiber line, but may also be wireless.

It is further preferred if the system comprises a consumer unit having a consumer valve. Opening of the consumer valve enables water to be drawn from the water reservoir. The control unit is advantageously configured to control an opening of the consumer valve in such a manner that water from the water reservoir, heated to disinfection temperature, is drawn from the water reservoir through the consumer valve, such that water can be provided at the consumer temperature from the water reservoir as soon as use of the consumer unit by a user is to be expected.

In other words, in this preferred embodiment, the system also comprises the consumer unit, and in particular a consumer valve by which the water is drawn from the water reservoir. For example, the consumer valve may be the valve that is opened to draw water from the tap of a washbasin or from the shower head of a shower. Such consumer valves may be controlled, for example, by an electronic pushbutton that, following actuation by a user, opens the valve for a predetermined period of time or a predetermined volume of flow.

In the preferred embodiment, this consumer valve may be controlled by the control unit of the system. In particular, the control unit may open the consumer valve and close it again. This possibility is used in this case to completely or partially drain water, heated to the disinfection temperature, from the water reservoir so that it can be refilled with cold, fresh water from a central water tank. For this purpose, it may also be necessary to open an inlet valve, if present, via which the inflow of water into the water reservoir is regulated. As a result of the water, heated to the disinfection temperature, being drained via the consumer valve, the internal surfaces of the pipes between the water reservoir and the actual outlet are advantageously also at least partially disinfected. In the present embodiment, the draining of the water is to be terminated as soon as use of the consumer unit can be expected again, in order to prevent injuries caused by the water heated to the disinfection temperature. For example, the draining may be controlled in such a manner that the temperature of the water in the water reservoir has returned to the consumer temperature when the taxiing phase on the apron, i.e. the flight phase intended for disinfection, is completed and the parking position is reached.

Alternatively or additionally, in a preferred embodiment, it is provided that the water reservoir has an infeed valve and an overflow, opening of the infeed valve enabling water to be replenished from a central water tank into the water reservoir, and water being able to flow out of the water reservoir via the overflow. The control unit is configured to control the opening of the infeed valve in such a manner that water heated to disinfection temperature flows out of the water reservoir through the overflow, such that water can be provided at the consumer temperature from the water reservoir as soon as use of the consumer unit by a user is to be expected.

In the preferred embodiment, the water reservoir is provided with an infeed valve that must be opened in order to fill the water reservoir with water from a central water tank. Such an arrangement is suitable, in particular, if a high-pressure system is used to supply the water reservoir and the water is stored in the water reservoir at a lower pressure.

Furthermore, the water reservoir has an overflow through which water can drain from the water reservoir to prevent damage to the water reservoir if it is overfilled, or for aeration and deaeration of the water reservoir. This overflow is used, advantageously, to allow water heated to disinfection temperature to drain from the water reservoir, with cold water from the water tank being filled into the water reservoir filled with hot water. Specifically, the infeed valve is kept open until the consumer temperature has been reached again by mixing of the cold, incoming water and the hot water present in the water reservoir. This procedure has the advantage that no water heated to disinfection temperature flows through the consumer unit, and thus the risk of injury from the hot water is minimised.

Preferably, the control unit is furthermore configured to heat water in the water reservoir to disinfection temperature only when one or more cabin data assume predetermined values. Advantageously, the cabin data may also be tapped from a bus and provide indications as to whether there is a risk that a person may operate the consumer unit.

Preferably, the consumer unit is a washbasin or shower in a washroom, and the one or more cabin data are a usage status of the washroom and/or a status of a presence sensor that senses a presence of a person in the washroom. Thus, for example, heating of the water in the water reservoir assigned to the consumer unit may be allowed only when the usage status of the washroom indicates that the washroom is unused, i.e., no person is present in the washroom. For the same purpose, alternatively or additionally, presence sensors may be used, which otherwise, for example, dispense water from a tap when approached, i.e., open the corresponding consumer valve, or monitor the presence of persons in a washroom.

In another preferred embodiment, the system furthermore comprises a flow disinfection unit that disinfects water flowing out of the water reservoir. The control unit in this case is configured to deactivate the flow disinfection unit when water held in the water reservoir is heated to the disinfection temperature. The flow disinfection unit advantageously disinfects flow water by use of, for example, UV light. To prevent it from being damaged, it is switched off when the hot water, heated to disinfection operator, is drained from the water reservoir. The control unit may also be configured, for example, to activate the flow disinfection unit whenever the consumer valve is opened and the water in the water reservoir is maintained at the consumer temperature, in order in this case to selectively disinfect the outflowing water.

In a second aspect, the object on which the disclosure herein is based is achieved by a method for heating up water for a consumer unit in an aircraft that comprises a water reservoir, the water reservoir comprising a heating device by which water held in the water reservoir is heated to a consumer temperature, such that water is provided at the consumer temperature from the water reservoir to the consumer unit for immediate use. Water held in the water reservoir is automatically heated to a disinfection temperature, and a temperature of the water is maintained in the water reservoir for a disinfection period at or above the disinfection temperature at which germ formation and colonization in the water reservoir and on its internal surfaces are eliminated or suppressed by thermal treatment. The water contained in the water reservoir is heated to the disinfection temperature only during flight phases or portions of flight phases of the aircraft during which use of the consumer unit by a user is not to be expected.

It is preferred in this case if a current flight phase of the aircraft is obtained from a data bus of the aircraft.

In a preferred design of the method, opening of a consumer valve enables water to be drawn from the water reservoir. The consumer valve is opened in such a manner that water from the water reservoir, heated to disinfection temperature, is drawn from the water reservoir through the consumer valve, such that water can be provided at the consumer temperature from the water reservoir as soon as use of the consumer unit by a user is to be expected.

Alternatively or additionally, it is preferred if opening of an infeed valve enables water to be replenished from a central water tank into the water reservoir, and water can flow out of the water reservoir via an overflow, the infeed valve being opened in such a manner that water from the water reservoir, heated to disinfection temperature, flows out of the water reservoir through the overflow, such that water can be provided at the consumer temperature from the water reservoir as soon as use of the consumer unit by a user is to be expected.

In a preferred embodiment, water in the water reservoir is heated to disinfection temperature only when one or more cabin data assume predetermined values.

The consumer unit is preferably a washbasin or shower in a washroom, and the one or more cabin data are a usage status of the washroom and/or a status of a presence sensor that senses a presence of a person in the washroom.

The system preferably furthermore comprises a flow disinfection unit that disinfects water flowing out of the water reservoir, the flow disinfection unit being deactivated when water held in the water reservoir is heated to the disinfection temperature. In an example preferred embodiment, the flow disinfection unit is activated whenever water maintained at the consumer temperature is drawn from the water reservoir, in order to disinfect the outflowing water.

The advantages of the different embodiments of the method described above correspond to the advantages of the respective embodiments of the system also described above, which have features corresponding to each other.

In a further aspect, the object is achieved by an aircraft having a system described above. The advantages of the aircraft correspond to the advantages of the system used therein.

BRIEF DESCRIPTION OF THE DRAWINGS

The disclosure herein is described in greater detail in the following with reference to the drawings, in which.

DETAILED DESCRIPTION

Figure 1:
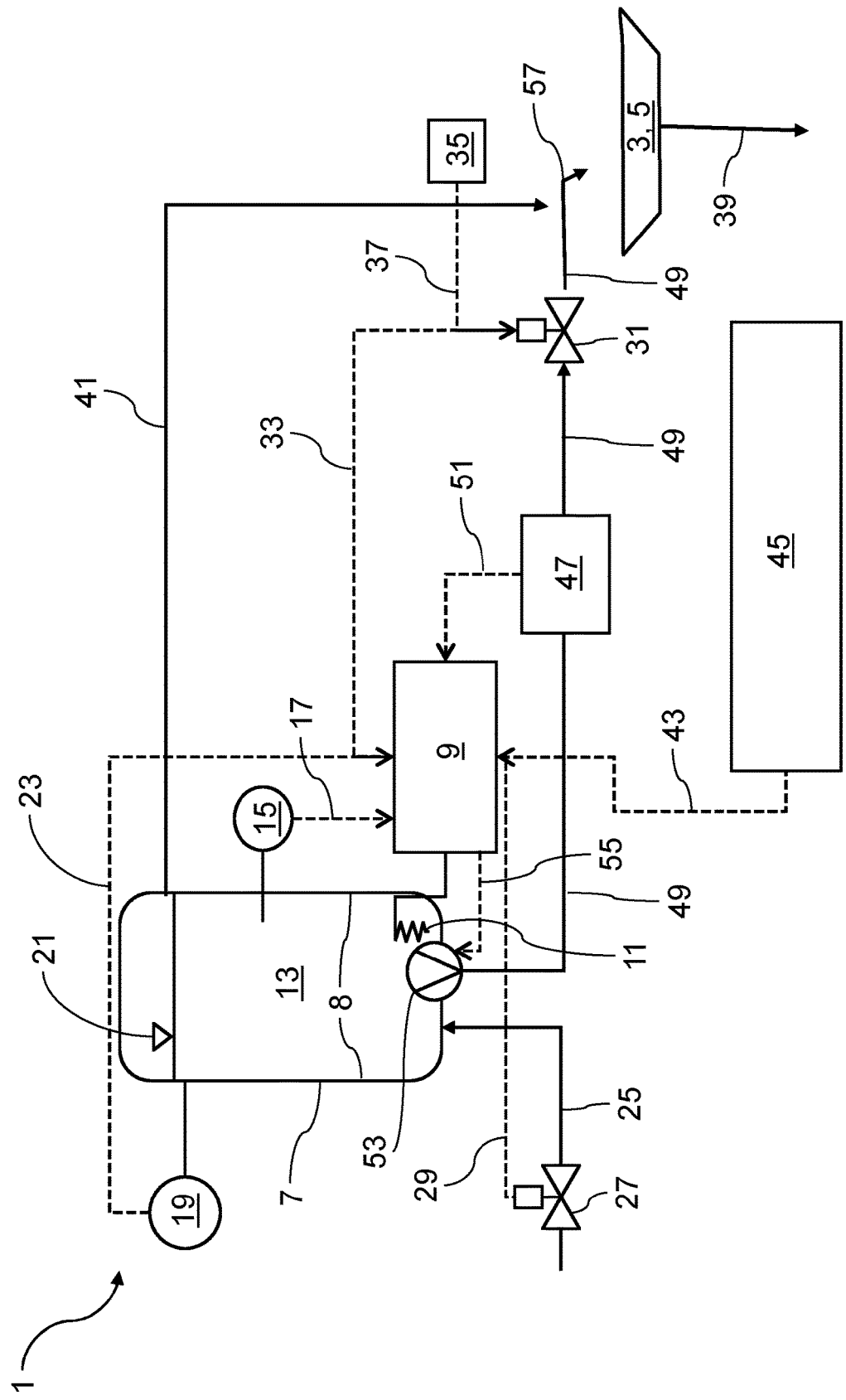
FIG. 1 shows a first example embodiment of a system for heating up water for a consumer unit in an aircraft.

FIG. 1 shows a first example embodiment of a system 1 for heating up water for a consumer unit 3 in the form of a washbasin 5. The system 1 comprises a water reservoir 7, which has internal surfaces 8, and a control unit 9. Located in the water reservoir 7 there is heating device 11, by which water 13 contained in the water reservoir 7 can be heated. The heat output of the heating device 11 is controlled by the control unit 9. Furthermore, a temperature sensor 15 is provided, which is connected to the control unit via a connection 17, which may be realized, for example, as a digital data line or directly transmits an analogue or discrete signal, and which measures the temperature of the water 13 in the water reservoir 7. In addition, the system 1 comprises a level sensor 19 by which the fill level 21 of the water reservoir 7 is determined and transmitted to the control unit 9 via a connection 23, which connection 23 may also be realized as a digital data line or, alternatively, may also directly transmit an analogue or discrete measurement signal to the control unit 9.

The water reservoir 7 may be filled via an infeed 25 from a central water tank, not represented. In the example embodiment in FIG. 1, the pipes between the infeed 25 and the central water tank are under high pressure. A filling valve 27 is therefore provided, which must be opened to fill the water reservoir 7. The opening and closing of the filling valve 27 is also controlled by the control unit 9, the control commands being transmitted via a connection 29. The connection 29 is preferably realized as a digital data line. Instead of a digital data line, however, it is also conceivable to transmit an analogue or discrete signal directly.

A consumer valve 31 is provided to draw water from the water reservoir 7 at the washbasin 5. The opening and closing of the consumer valve 31 may be controlled both by the control unit 9 via a connection 33, which may be realized, for example, as a digital data line or also be realized for the transmission of analogue signals, and by a consumer, by a pushbutton 35, which in the present example embodiment is likewise connected to the consumer valve 31 via a connection 37. If the user actuates the pushbutton 35, a signal is sent via the data line 37 to the consumer valve 31, which thereupon opens for a predetermined period of time or a predetermined quantity of water. Water can flow out of the washbasin 5 through a drain 39 into a waste-water tank or to the outside. The waste-water tank, or the external drain, are not represented here.

The water reservoir 7 additionally has an overflow 41 through which water can run out of the water reservoir 7 when the latter is filled above an intended fill level 21. This prevents damage to the water reservoir 7 and provides for its aeration and deaeration. In the example embodiment shown in FIG. 1, the overflow 41 leads into the washbasin 5. It is equally possible, however, to direct the overflow directly to the outside or, for example, directly into the drain 39 of the washbasin 5.

Finally, the control unit 9 is connected, via a data line 43, to a data network 45 of the aircraft via which it can receive flight data such as, for example, a current flight phase, and also cabin data such as, for example, a usage status of a washroom. The data network 45 may be, for example, a data bus from which the control unit 9 independently reads the required data. It is also possible, however, for a central computing unit in the aircraft to automatically send the required data to the control unit 9, or for the control unit 9 to request it from a central computing unit. Other designs are also conceivable.

Furthermore, the system 1 has a flow disinfection unit 47 that, by UV light, can disinfect water flowing from the water reservoir 7 through a supply pipe 49. The supply pipe 49 connects the water reservoir 7 to the consumer valve 31. The flow disinfection unit 47 is also connected to the control unit 9 via a data line 51, such that the flow disinfection unit 47 can be switched on and off by the control unit 9 as required.

In the present example embodiment, a water reservoir 7 is provided in which the water 13 is held at ambient pressure. Located in the water reservoir 7, therefore, is a micropump 53, by which water can be delivered from the water reservoir 7, through the supply pipe 49 and the consumer valve 31, to a tap 57, from which the water flows into the washbasin 5. In an alternative embodiment, the micropump may also be connected directly to the supply pipe 49, outside of the water reservoir 7. The micropump 53 is connected to the control unit 9 via a data line 55 and can be activated or deactivated, or switched on and off, by the control unit 9. The micropump 53 is also activated when the pushbutton 35 is actuated by a user in order to deliver water from the water reservoir 7 into the washbasin 5.

During flight, when the washbasin 5, or the consumer unit 3, is to be used by users such as, for example, passengers or cabin crew, the control unit 9 controls the heating device 11 such that the water 13 held or contained in the water reservoir 7 is maintained at a consumer temperature. The consumer temperature is selected such that the water is at a comfortable temperature for hand washing, for example. For example, in this case the consumer temperature may be 37° C. Preferably, the consumer temperature is more than 20° C. and less than 40° C. In order to set the required water temperature, the control unit 9 in this case uses the measured values provided by the temperature sensor 15.

Since water 13 held in the water reservoir 7 is already heated to a suitable consumer temperature, it can advantageously be dispensed directly from the tap 57 into the washbasin 5 without the risk of scalding. In particular, there is thus no need for a mixer tap in which water heated in the conventional manner to higher temperatures such as, for example, 60° C., is mixed again with cold water in order to lower the temperature of the water to a temperature range in which there is no risk of scalding. This makes it possible to save the weight of the mixer tap and also saves energy, as the water does not first have to be heated to a higher temperature, at which higher heat losses occur, or thicker insulation is necessary, in order subsequently to cool it down again to a temperature suitable for dispensing by mixing with cold water from a water tank. The present water reservoir 7 can therefore be more compact and lighter in design, as less insulation material is required.

In order to prevent the formation and colonisation of germs in the water reservoir 7, it is regularly heated to a disinfection temperature or above, for example once a day, during a flight phase in which use of the consumer unit 3 is not expected, and maintained at this temperature, or above, for a disinfection period. Disinfection temperature is for example 60° C., more than 60° C., more than 70° C. or more than 80° C. As a result of the water being heated in the water reservoir 7, germ colonisation in the water and on internal surfaces 8 of the water reservoir 7 is prevented, or killed. The disinfection period may be, for example, more than 1 minute, more than 5 minutes or more than 10 minutes. After the disinfection period has elapsed, the temperature of the water 13 in the water reservoir 7 is lowered again to the consumer temperature.

For this purpose, for example, the consumer valve 31 may be opened by the control unit 9 and the micropump 53 activated, such that the water heated to the disinfection temperature flows out through the supply pipe 49, the consumer valve 31 and the tap 57 into the washbasin 5. This has the advantage that, as the water flows out, the components located between the water reservoir 7 and the washbasin 5 are also thermally treated. Subsequently, or in parallel, the control unit 9 opens the infeed valve 27, such that water from the central water tank (not represented) can flow through the infeed pipe, or infeed 25, into the water reservoir 7.

Alternatively, for the purpose of lowering the temperature of the water 13 in the water reservoir 7 to the consumer temperature, the control unit 9 may also merely open the infeed valve 27, such that cold water from the central water tank (not represented) flows through the infeed 25 into the water reservoir 7 and mixes with the water 13 heated to disinfection temperature. Excess water can then flow out through overflow 41. When the temperature of the water 13 in the water reservoir 7, measured by the temperature sensor 15, has dropped back to the consumer temperature, the control unit 9 closes the infeed valve 27. This procedure is advantageous, in particular, when the overflow 41 is routed directly to the outside or leads directly into the drain 39 of the washbasin, since in this way the risk of scalding a user of the consumer unit 3 is reduced. Also, the risk of possible damage to temperature-sensitive components between the water reservoir 7 and the tap 57, such as a flow disinfection unit 47, by the hot water is reduced.

In order to categorically prevent a user of the consumer unit 3 from being scalded, the heating of the water 13 in the water reservoir 7 is effected exclusively during flight phases or portions of flight phases in which it can be assumed that the consumer unit is not being used. An example of such a flight phase is the approach, the actual landing and the subsequent taxiing on the runway and the apron until the actual parking position is reached. During these flight phases, or portions of flight phases, the use of consumer units is prohibited, and it can therefore be assumed that the consumer unit is not being used by a user. Which flight phase the aircraft is currently in can be requested by the control unit 9 from the aircraft network 45 via the data line 43. The control of the disinfection of the water reservoir 7 is effected in such a manner that, at the end of the disinfection flight phase, for example when the parking position is reached, the water temperature in the water reservoir 7 has dropped again to the consumer temperature.

In addition, in the example embodiment in FIG. 1, it is provided that the control unit 9 also requests cabin data from the aircraft network 45 and takes it into account in the thermal treatment of the water reservoir 7. For example, the control unit 9 may be designed to heat the water 13 in the water reservoir 7 to the disinfection temperature only when a washroom in which the washbasin 5 is located is not in use. Presence sensors may also be used to check whether a person is in the washroom. Furthermore, the pushbutton 35, which can be used to request water from the water reservoir 7 to be dispensed from the tap 57, may be deactivated by the control unit 9 during the disinfection flight phase in order to prevent water heated to disinfection temperature from being dispensed into the washbasin 5.

In the example embodiment shown in FIG. 1, the control unit 9 also switches off the flow disinfection unit 47 during the discharge of the water heated to the disinfection temperature, in order to prevent it from being damaged by water flowing out of the supply pipe 49. In principle, the control unit 9 is configured such that the flow disinfection unit is always active when the consumer valve 31 is open, such that water flowing out of the tap 57 is additionally disinfected.

Figure 2:
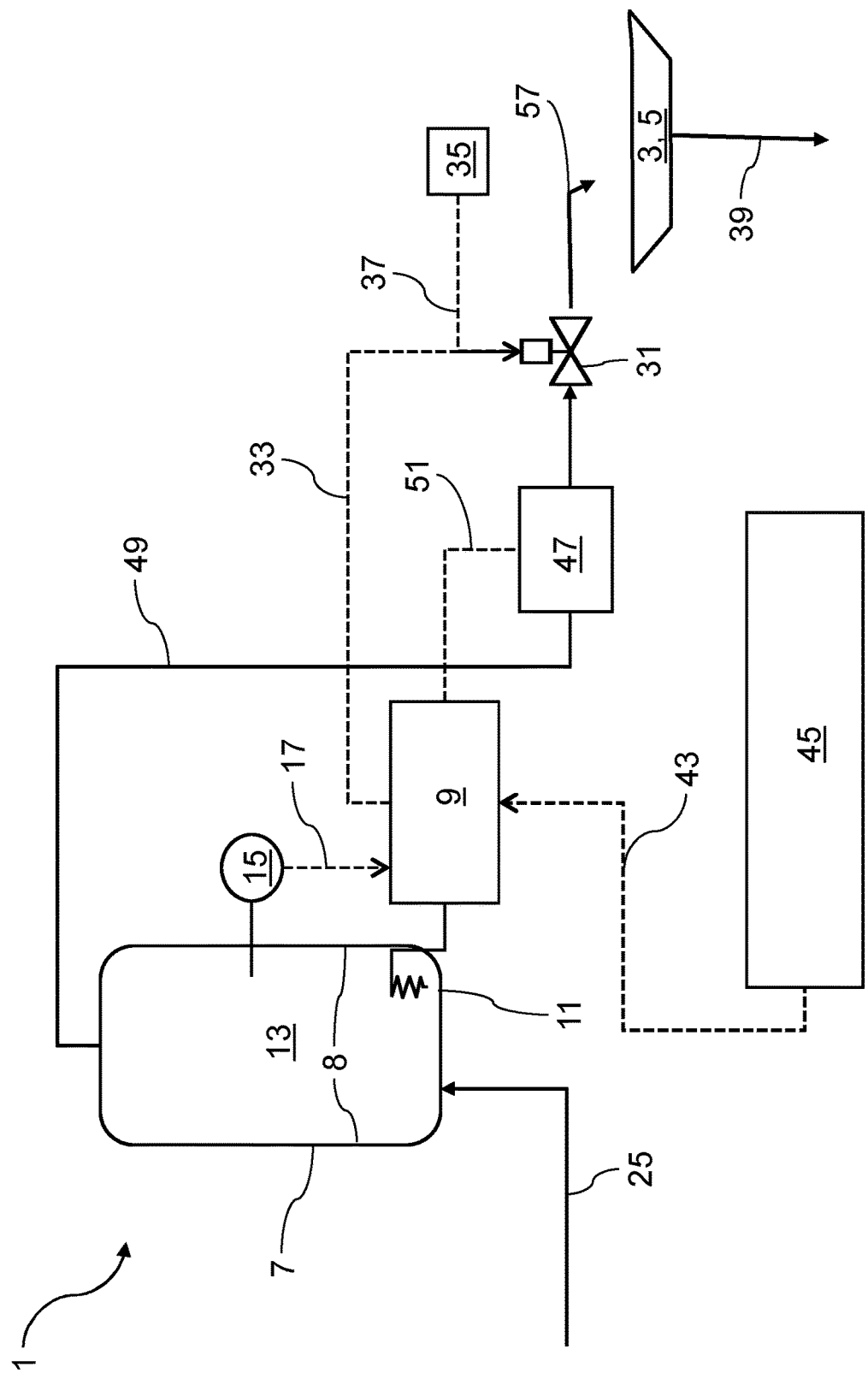
FIG. 2 shows a second example embodiment of a system for heating up water for a consumer unit in an aircraft.

Represented in FIG. 2 is a second example embodiment of a system 1 for heating up water for a consumer unit 3 in the form of a washbasin 5 in an aircraft. The example embodiment in FIG. 2 is only described in greater detail insofar as it differs from the example embodiment in FIG. 1. In both figures, elements that have the same designation are denoted by the same reference.

The system 1 from FIG. 2 differs from the system in FIG. 1, in particular, in that the water 13 in the water reservoir 7 is under pressure, and there is no infeed valve located between the central water tank (not represented), from which the water reservoir 7 is supplied with fresh water via the infeed 25, and the water reservoir 7 itself. In this embodiment, if the consumer valve 31 is opened such that water 13 flows out of the water reservoir 7 through the supply pipe 49 and the tap 57 into the washbasin 5, fresh water immediately flows out of the water tank, through the infeed 25, into the water reservoir 7.

In deviation from the procedure in the example embodiment described in relation to FIG. 1, in the example embodiment shown in FIG. 2 only the consumer valve 31 is opened by the control unit 9 for the purpose of lowering the water temperature from the disinfection temperature to the consumer temperature. When the hot water flows out of the water reservoir 7 through the supply pipe 49 and the tap 57 into the washbasin 5, cold water immediately flows in from the central water tank (not represented) through the infeed 25. As a result of the hot water 13 in the water reservoir 7 being mixed with the cold water flowing in from the infeed 25, the temperature of the water 13 in the water reservoir 7 drops again to the consumer temperature. If necessary, the control unit 9 may be configured in such a manner that it does not close the consumer valve 31 when the temperature sensor 15 measures the consumer temperature again, but allows the water to flow further through the supply pipe 49 until it is ensured that no more hot water remains in the supply pipe 49 either.

Figure 3:
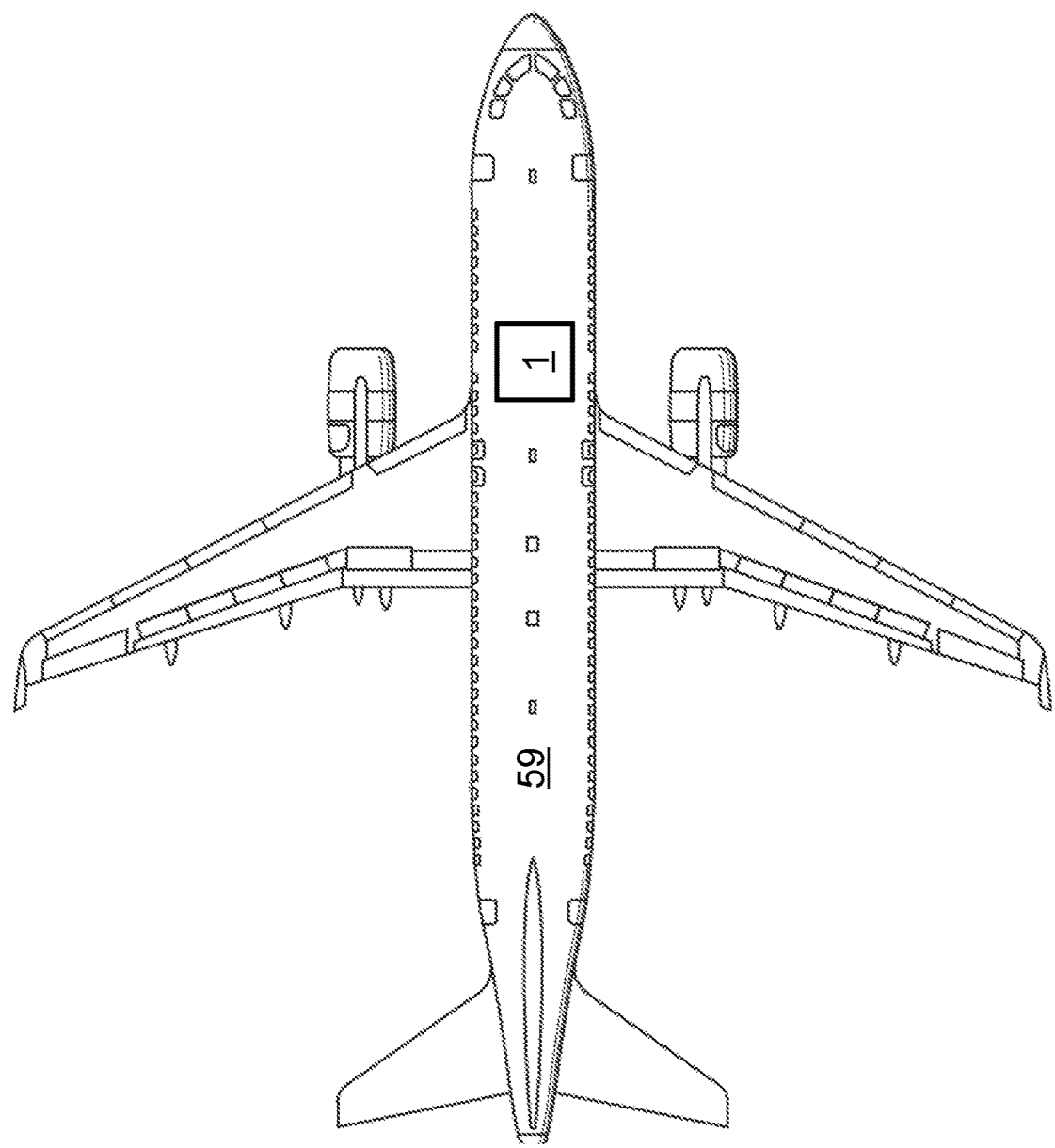
FIG. 3 shows an example embodiment of an aircraft having a system for heating up water for a consumer unit.

Finally, FIG. 3 shows an example embodiment of an aircraft 59 in which a system 1 according to FIG. 1 or FIG. 2 can be used.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for heating water for a consumer in an aircraft, the system comprising:
a water reservoir comprising a heater configured to heat water held in the water reservoir to a consumer temperature, so the water can be provided at the consumer temperature from the water reservoir to the consumer for immediate use; and
a controller configured to control the heater so the water held in the water reservoir is automatically heated to or above a disinfection temperature, which is a temperature at which germ formation in the water reservoir and on internal surfaces of the water reservoir is eliminated or suppressed by thermal treatment, the controller maintaining a temperature of the water in the water reservoir at or above the disinfection temperature for a disinfection period;
wherein the controller is configured to heat the water in the water reservoir to the disinfection temperature only during flight phases or portions of flight phases of the aircraft when a user is not expected to use the consumer.

2. The system according to claim 1, the controller being configured to be connected to a data bus of the aircraft and to receive from the data bus a current flight phase of the aircraft.

3. The system according to claim 1, wherein:
the consumer has a consumer valve that is configured so, when open, the water can be drawn from the water reservoir; and
the controller is configured to control an opening of the consumer valve so the water from the water reservoir, heated to disinfection temperature, is drawn from the water reservoir through the consumer valve, so the water can be provided at the consumer temperature from the water reservoir as soon as use of the consumer by the user is expected.

4. The system according to claim 1, comprising an infeed valve and an overflow, the infeed valve being configured, when open, to enable the water in the water reservoir to be replenished from a central water tank into the water reservoir, and the overflow being configured so the water can flow out of the water reservoir via the overflow;
wherein the controller is configured to control the infeed valve to open, so the water, heated to the disinfection temperature, flows out of the water reservoir through the overflow, so the water can be provided at the consumer temperature from the water reservoir as soon as use of the consumer by the user is expected.

5. The system according to claim 1, wherein the controller is configured to heat the water in the water reservoir to disinfection temperature only when one or more cabin data assume predetermined values.

6. The system according to claim 5, wherein the consumer is a washbasin or shower in a washroom, and the one or more cabin data comprises a usage status of the washroom and/or a status of a presence sensor that senses a presence of the user in the washroom.

7. The system according to claim 1, comprising a flow disinfection unit configured to disinfect the water flowing out of the water reservoir;
wherein the controller is configured to deactivate the flow disinfection unit when the water held in the water reservoir is heated to the disinfection temperature.

8. A method for heating up water for a consumer in an aircraft, the method comprising:
providing a water reservoir within the aircraft, the water reservoir comprising a heater;
providing water within the water reservoir;
heating, using the heater, the water within the water reservoir to a consumer temperature;
providing the water at the consumer temperature from the water reservoir to the consumer for immediate use; and
automatically heating the water held in the water reservoir to a disinfection temperature, which is a temperature at which germ formation in the water reservoir and on internal surfaces of the water reservoir is eliminated or suppressed by thermal treatment, a temperature of the water in the water reservoir being maintained at or above the disinfection temperature for a disinfection period;

wherein the water contained in the water reservoir is heated to the disinfection temperature only during flight phases or portions of flight phases of the aircraft when a user is not expected to use the consumer.

9. The method according to claim 8, comprising obtaining a current flight phase of the aircraft from a data bus of the aircraft.

10. The method according to claim 8, wherein:
the consumer has a consumer valve, the consumer valve being configured such that, when open, the water can be drawn from the water reservoir;
the method comprising:
opening the consumer valve so the water from the water reservoir, heated to disinfection temperature, is drawn from the water reservoir through the consumer valve, so the water can be provided at the consumer temperature from the water reservoir as soon as use of the consumer by the user is expected.

11. The method according to claim 8, wherein:
opening of an infeed valve enables the water in the water reservoir to be replenished from a central water tank into the water reservoir and water is able to flow out of the water reservoir via an overflow; and
the infeed valve being opened so the water, heated to the disinfection temperature, flows out of the water reservoir, through the overflow, so the water can be provided at the consumer temperature from the water reservoir as soon as use of the consumer by the user is expected.

12. The method according to claim 8, wherein the water in the water reservoir is heated to disinfection temperature only when one or more cabin data assume predetermined values.

13. The method according to claim 12, wherein the consumer unit is a washbasin or shower in a washroom, and the one or more cabin data comprises a usage status of the washroom and/or a status of a presence sensor that senses a presence of the user in the washroom.

14. The method according to claim 8, wherein the water flowing out of the water reservoir is disinfected by a flow disinfection unit, the flow disinfection unit being deactivated when the water in the water reservoir is heated to the disinfection temperature.

15. An aircraft having a system according to claim 1.

* * * * *